(12) United States Patent
Bradley et al.

(10) Patent No.: US 9,249,882 B2
(45) Date of Patent: Feb. 2, 2016

(54) DUAL CLUTCH TRANSMISSION

(75) Inventors: Jesse B. Bradley, Royal Oak, MI (US);
John E. Marano, Milford, MI (US);
Joseph B. Burtch, Lake Orion, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 219 days.

(21) Appl. No.: 13/349,091

(22) Filed: Jan. 12, 2012

(65) Prior Publication Data
US 2013/0184946 A1 Jul. 18, 2013

(51) Int. Cl.
| | |
|---|---|
| *F16H 61/00* | (2006.01) |
| *F16H 61/688* | (2006.01) |
| *F16H 61/14* | (2006.01) |
| *F16H 59/66* | (2006.01) |
| *F16H 59/72* | (2006.01) |

(52) U.S. Cl.
CPC ..... *F16H 61/688* (2013.01); *B60Y 2300/18025* (2013.01); *F16D 2500/10412* (2013.01); *F16D 2500/30404* (2013.01); *F16D 2500/3127* (2013.01); *F16D 2500/3144* (2013.01); *F16D 2500/70247* (2013.01); *F16D 2500/70454* (2013.01); *F16H 2059/663* (2013.01); *F16H 2059/725* (2013.01); *F16H 2061/145* (2013.01); *Y10T 74/19233* (2015.01)

(58) Field of Classification Search
CPC .......... B60W 2510/029; B60W 2550/12; B60W 10/026; B60W 10/023; F16H 61/43; F16H 2061/145

USPC .............................................. 74/330; 477/901
See application file for complete search history.

(56) References Cited

U.S. PATENT DOCUMENTS

| | | | | |
|---|---|---|---|---|
| 4,858,131 | A | * | 8/1989 | Sugimura et al. ............... 701/68 |
| 5,129,496 | A | * | 7/1992 | Sigl et al. ......................... 192/49 |
| 5,807,204 | A | * | 9/1998 | Shiiba et al. .................... 477/176 |
| 7,032,697 | B2 | * | 4/2006 | Lee ............................. 180/65.25 |
| 2003/0135320 | A1 | * | 7/2003 | Bellinger ....................... 701/103 |
| 2004/0038776 | A1 | * | 2/2004 | Kuhstrebe et al. .............. 477/77 |
| 2005/0000305 | A1 | * | 1/2005 | Yamada et al. .................. 73/865 |
| 2005/0071065 | A1 | * | 3/2005 | Zimmermann et al. ........ 701/51 |
| 2005/0072255 | A1 | * | 4/2005 | McCrary et al. ................ 74/330 |
| 2006/0161325 | A1 | * | 7/2006 | Jiang ............................... 701/54 |
| 2007/0220999 | A1 | * | 9/2007 | Hatori et al. .................... 74/330 |
| 2008/0125287 | A1 | * | 5/2008 | Kakiuchi et al. .............. 477/114 |

* cited by examiner

*Primary Examiner* — Khoi Tran
*Assistant Examiner* — Ryan Rink

(57) ABSTRACT

A transmission for a motor vehicle with an engine includes a transmission housing and a dual clutch assembly with a clutch housing connectable to an engine output member. The clutch housing is rotationally supported within the transmission housing. The selective engagement of the dual clutch assembly interconnects the dual clutch housing with at least one of a first input member and a second input member. The transmission also includes a plurality of gear sets associated with various forward and reverse gear ratios, a controller implemented with an algorithm that provides a lock-up profile for the dual clutch assembly, and a plurality of synchronizer assemblies that couple at least one of the gear sets with at least one of a first countershaft and a second countershaft. The selective engagement of at least one of the synchronizer assemblies establishes at least one of the forward speed ratios.

10 Claims, 3 Drawing Sheets

DUAL CLUTCH TRANSMISSION

FIELD

The present invention relates to transmissions. More specifically, the present invention relates to dual clutch transmissions.

BACKGROUND

The statements in this section merely provide background information related to the present disclosure and may or may not constitute prior art.

Some motor vehicles include a dual clutch transmission with a pair of operating clutches which drive a pair of input shafts. The input shafts may be located on opposite sides of an output shaft or may be located concentrically between spaced-apart output shafts. A plurality of synchronizers selectively couple rotatable gears associated with the shafts to achieve forward and reverse gear ratios. Typically, the dual clutch transmission is under the direction of a controller that provides a lock-up profile for launching the motor vehicle. The lock-up profile, however, sets the engine speed targets as a function of the accelerator pedal position.

Accordingly, there is a need for a dual clutch transmission with an improved lock-up profile.

SUMMARY

A transmission for a motor vehicle with an engine includes a transmission housing and a dual clutch assembly with a clutch housing connectable to an engine output member. The clutch housing is rotationally supported within the transmission housing. The selective engagement of the dual clutch assembly interconnects the dual clutch housing with at least one of a first input member and a second input member. The transmission also includes a plurality of gear sets associated with various forward and reverse gear ratios, a controller implemented with an algorithm that provides a lock-up profile for the dual clutch assembly, and a plurality of synchronizer assemblies that couple at least one of the gear sets with at least one of a first countershaft and a second countershaft. The selective engagement of at least one of the synchronizer assemblies establishes at least one of the forward speed ratios.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
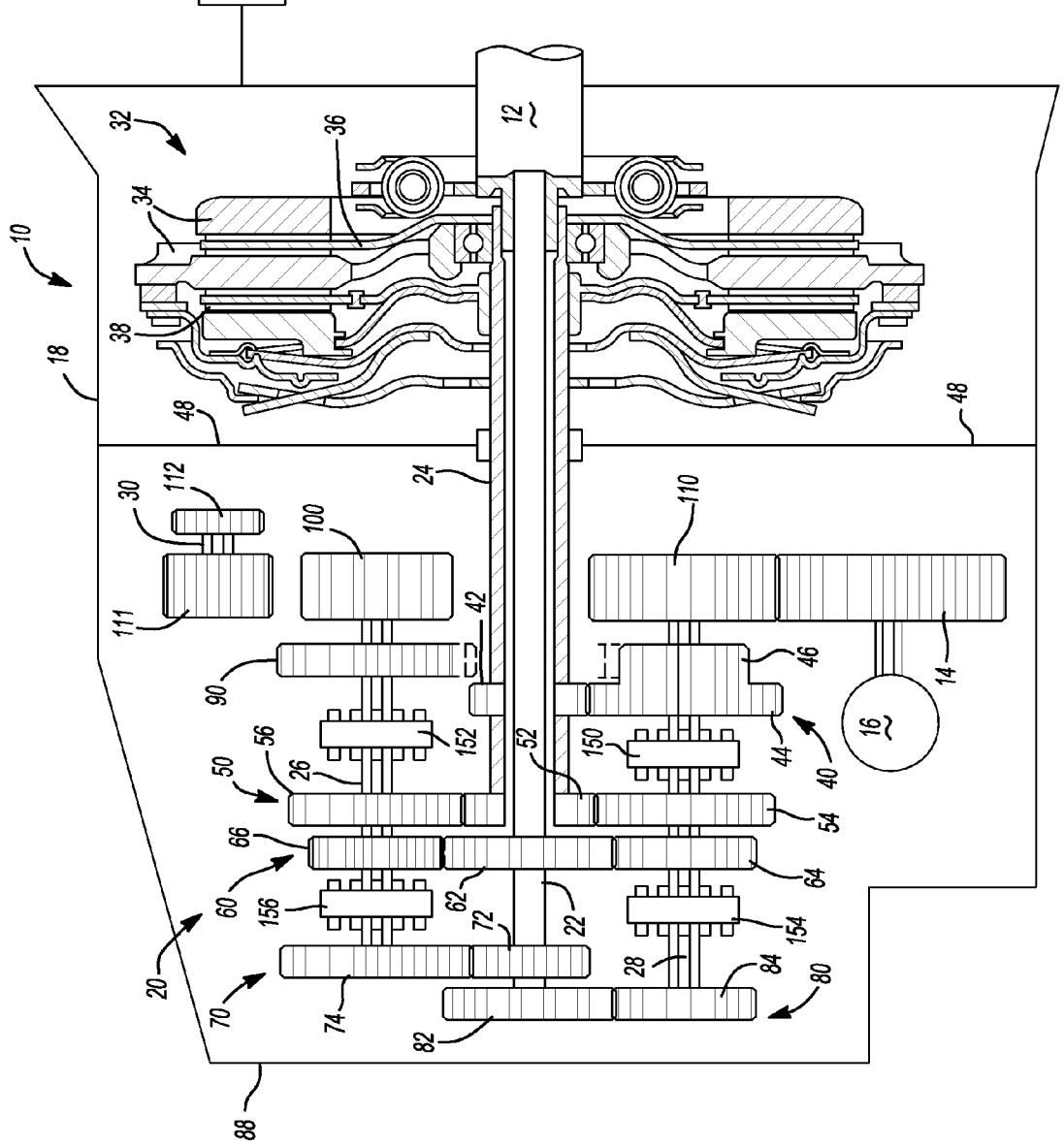
FIG. 1 is a schematic view of a dual clutch transmission.

Referring to FIG. 1, a multiple speed transmission is generally indicated by reference number 10. The transmission 10 is connectable to an input member 12 and has an output member or gear 14. In the present embodiment, the input member 12 is a shaft and the output member 14 is a gear, however those skilled in the art will appreciate that the input member 12 may be components other than shafts and the output member 14 may be a component, such as a shaft, other than a gear.

The input member 12 is continuously connected with an engine (not shown) or other torque producing machine to provide a driving torque to input member 12. The output member or gear 14 rotatably drives a differential assembly 16. The differential assembly 16 transfers torque delivered by output member 14, ultimately, to a pair road wheels (not shown).

The transmission 10 includes a housing 18 that at least partially encloses a gearing arrangement 20. The gearing arrangement 20 includes various shafts or members, co-planar intermeshing gear sets, a dual clutch assembly, and selectively engageable synchronizers, as will be described herein. For example, the gearing arrangement 20 includes a first transmission input shaft or member 22, a second transmission input shaft or member 24, a first countershaft 26, a second countershaft 28 and park gear shaft 30. The second transmission input shaft or member 24 is a sleeve (hollow) shaft that is concentric with and overlies the first transmission input shaft or member 22. The first countershaft 26, the second countershaft 28 and the park gear shaft 30 are each spaced apart from and parallel with the first and second transmission input shaft members 22, 24. The first and second transmission input shafts 22, 24 define a first axis of rotation, the first countershaft 26 defines a second axis of rotation and the second countershaft 28 defines a third axis of rotation. The position and location of countershafts 26 and 28 relative to first and second transmission input shafts 22, 24 are interchangeable.

A dual clutch assembly 32 is connected between the input member 12 and the first and second transmission input shaft members 22, 24. The dual clutch assembly 32 includes a clutch housing 34 connectable for common rotation with the input member 12. Further, the dual clutch assembly 32 has first and second clutch elements or hubs 36 and 38. Clutch elements 36 and 38 together with the clutch housing 34 are configured to form a friction clutch, as is known in the art as a dual clutch. More specifically, clutch elements 36, 38 and the clutch housing 34 have friction plates mounted thereon or otherwise coupled thereto that interact to form a friction clutch. The clutch element 36 is connected for common rotation with the first transmission input shaft or member 22 and the clutch element 38 is connected for common rotation with the second transmission input shaft or member 24. Thus, selective engagement of clutch element 36 with the clutch housing 34 connects the input member 12 for common rotation with the first transmission input shaft member 22. Selective engagement of clutch element 38 with the clutch housing 34 connects the input member 12 for common rotation with the second transmission input shaft member 24.

The gearing arrangement 20 also includes a plurality of co-planar, meshing gear sets 40, 50, 60, 70 and 80. The present invention contemplates that the plurality of co-planar, meshing gear sets 40, 50, 60, 70 and 80 may be arranged axially along transmission input shafts 22, 24 in an order other than that which is shown in FIG. 1 and still be within the scope of the invention. Co-planar gear set 40 includes gear 42 and gear 44. Gear 42 is rotatably fixed and connected for common rotation with the second transmission input shaft member 24. Gear 44 is selectively connectable for common rotation with the second countershaft member 28 and meshes with gear 42. Gear 44 includes a secondary gear portion 46 that is kinematically connected to and fixed for common rotation with gear 44. Secondary gear portion 46 may have the same or a different gear tooth count or gear pitch relative to other portions of gear 44, as necessary to implement a desired reverse gear ratio. It should be appreciated that gear 42 may be a separate gear structure fixed to the second transmission input shaft member 24 or gear teeth/splines formed on an outer surface of the second transmission input shaft member 24 without departing from the scope of the present invention. Gear set 40 is disposed proximate a wall 48 of the transmission housing 18 that is on a front or side of the transmission 10 proximate the dual clutch assembly 32.

Co-planar gear set 50 includes gear 52, gear 54 and gear 56. Gear 52 is rotatably fixed and connected for common rotation with the second transmission input shaft member 24 and meshes with gear 54 and gear 56. Gear 54 is selectively connectable for common rotation with the second countershaft member 28. Gear 56 is selectively connectable for common rotation with the first countershaft member 26. Gear set 50 is positioned adjacent gear set 40.

Co-planar gear set 60 includes gear 62, gear 64 and gear 66. Gear 62 is rotatably fixed and connected for common rotation with the first transmission input shaft member 22 and meshes with gear 64 and gear 66. Gear 64 is selectively connectable for common rotation with the second countershaft member 28. Gear 66 is selectively connectable for common rotation with the first countershaft member 26. Gear set 60 is disposed adjacent gear set 50.

Co-planar gear set 70 includes gear 72 and gear 74. Gear 72 is rotatably fixed and connected for common rotation with the first transmission input shaft member 22 and meshes with gear 74. Gear 74 is selectively connectable for common rotation with the first countershaft member 26. Gear set 70 is positioned adjacent gear set 60.

Co-planar gear set 80 includes gear 82 and gear 84. Gear 82 is rotatably fixed and connected for common rotation with the first transmission input shaft member 22 and meshes with gear 84. Gear 84 is selectively connectable for common rotation with the second countershaft member 28. Gear set 80 is positioned between gear set 70 and an end wall 88 of the transmission housing 18.

Reverse gear 90 is selectively connectable for common rotation with the first countershaft member 26 and meshes with a secondary gear portion 46 of stepped gear 44. As described previously, secondary gear portion 46 of gear 44 is fixed for common rotation with gear 44 and may have a different gear pitch than the gear pitch of gear 44, as required, to implement a reverse gear speed. Reverse gear 90 is located between gear set 50 and end wall 48. Reverse gear 90 and secondary gear portion 46 may be considered to be a sixth co-planar gear set.

Further, a first countershaft transfer gear 100 is rotatably fixed and connected for common rotation with the first countershaft member 26. A second countershaft transfer gear 110 is rotatably fixed and connected for common rotation with the second countershaft member 28. A park transfer gear 111 is rotatably fixed and connected for common rotation with the park gear shaft 30. First countershaft transfer gear 100 is configured to mesh with output member 14, the second countershaft transfer gear 110 is configured to mesh with output member 14 and park transfer gear 111 is configured to mesh with output member 14. However, the first countershaft transfer gear 100 the second countershaft transfer gear 110 and the park transfer gear 111 do not mesh with each other. The first countershaft transfer gear 100 is disposed between the reverse gear 90 and end wall 48 of the transmission housing 18. The second countershaft transfer gear 110 is disposed between gear 44 and end wall 48 of the transmission housing 18. The park transfer gear 111 is disposed proximate to wall 48 of transmission housing 18 and co-planar with output gear or member 14. Moreover, the output member 14 is co-planar with first and second countershaft transfer gears 100, 110. A park gear 112 is provided for placing transmission 10 in a park mode that prevents output member 14 from rotating. Park gear 112 is coupled to park transfer gear 111 through park gear shaft 30.

With continued reference to FIG. 1, the transmission 10 further includes a plurality of selectively engageable synchronizer assemblies 150, 152, 154 and 156. Synchronizers 150, 152, 154 and 156 are double sided synchronizers and generally include a shift fork (not shown) that is bi-directionally translated by an actuator (not shown) into at least two engaged positions and a neutral or disengaged position. In the present embodiment, synchronizer 150 is selectively actuatable to connect gear 44 for common rotation with the second countershaft member 28 and synchronizer 150 is selectively actuatable to connect gear 54 for common rotation with the second countershaft member 28. Synchronizer 152 is selectively actuatable to connect for common rotation reverse gear 90 with the first countershaft 26 and is selectively actuatable to connect for common rotation gear 56 with the first countershaft 26. Synchronizer 154 is selectively actuatable to connect for common rotation gear 64 with the second countershaft 28 and is selectively actuatable to connect for common rotation gear 84 with the second countershaft 28. Synchronizer 156 is selectively actuatable to connect for common rotation gear 66 with the first countershaft member 26 and is selectively actuatable to connect for common rotation gear 74 with the first countershaft member 26.

The transmission 10 is capable of transmitting torque from the input shaft 12 to the output gear member 14 in at least seven forward torque ratios and at least one reverse torque ratio. Each of the forward torque ratios and the reverse torque ratio is attained by selective engagement of the dual clutch assembly 32 and one or more of the synchronizer assemblies 150, 152, 154 and 156. Those skilled in the art will readily understand that a different speed ratio is associated with each torque ratio.

It should be appreciated that each individual gear set 40, 50, 60, 70 and 80 provides one or more forward and/or reverse gear ratios upon selective engagement of the synchronizer assemblies 150, 152, 154 and 156. It should also be appreciated that a particular forward or reverse speed ratio may be achieved by different combinations of synchronizer and associated gear sets without departing from the scope of the present invention.

Figure 2:
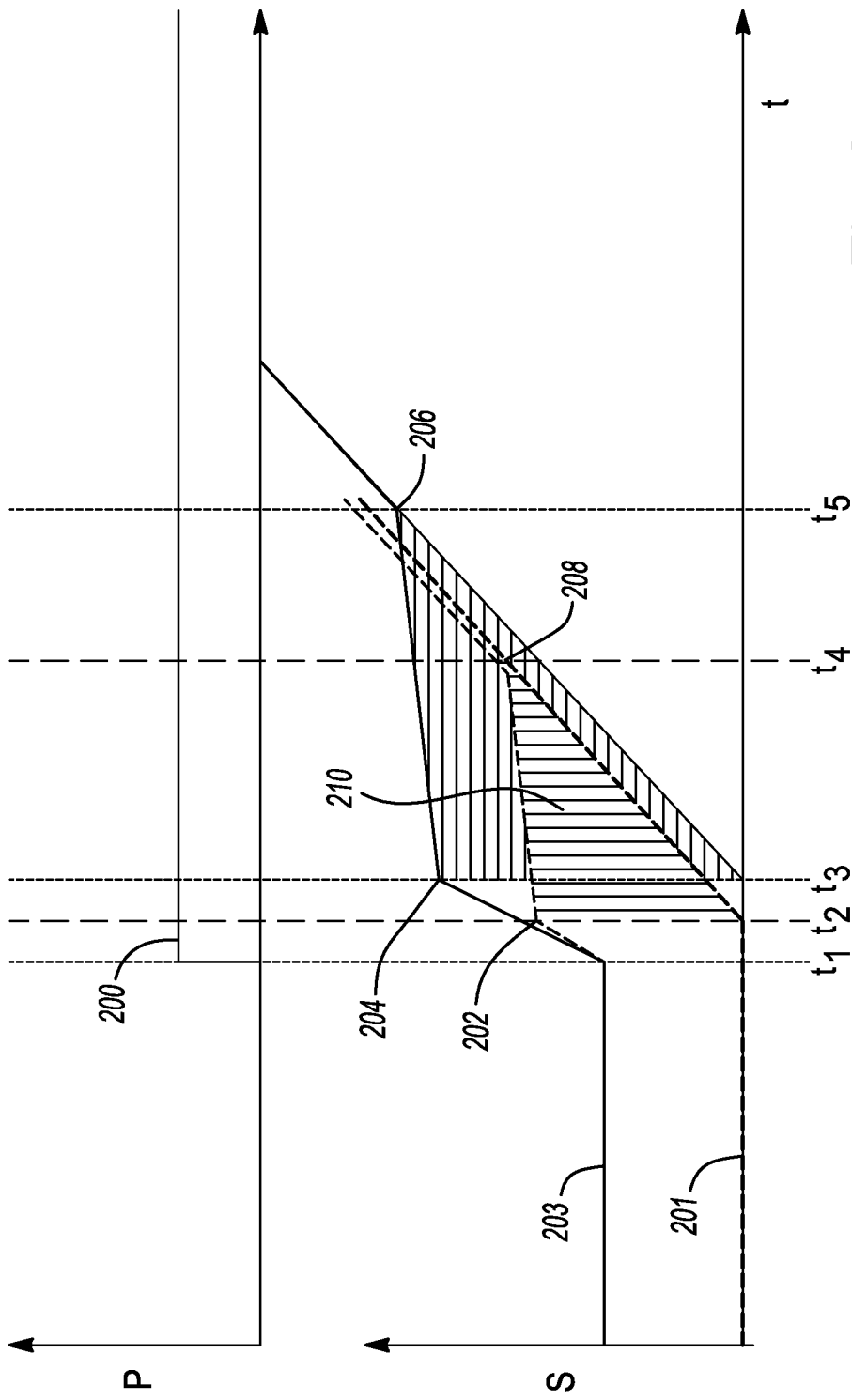
FIG. 2 is a graph showing a lock-up profile for the dual clutch transmission based on clutch interface temperature or current road grade in accordance with the principles of the present invention.
Figure 3:
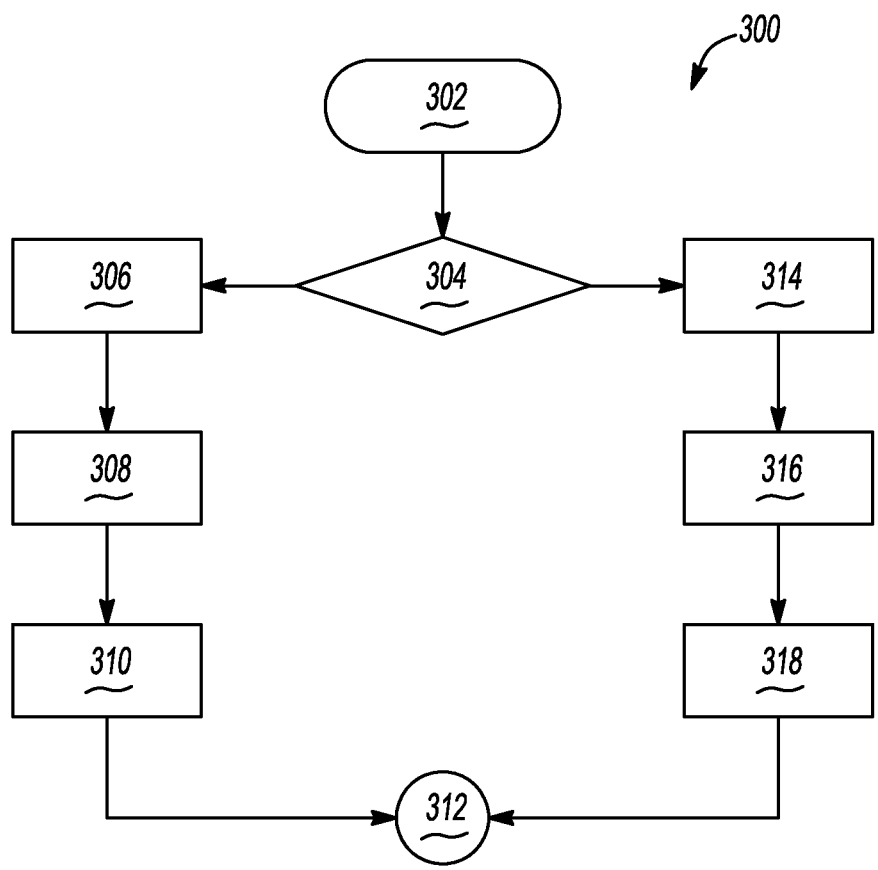
FIG. 3 is a process implementing the lock-up profile.

The operation of the transmission 10 is directed by a controller 190 implemented with an algorithm or process 300 (FIG. 3). The process 300 receives various inputs to provide a lock-up profile, as shown in FIG. 2. The top of the graph shows the accelerator pedal position 200 over time, t, and the bottom of the graph shows the countershaft speed 201 of the countershaft 26 or 28 and the input speed 203 from the input shaft 22 or 24.

In one implementation, at $t_1$ the driver steps on the accelerator pedal as indicated by the step increase in the pedal position 200 at $t_1$. Then a process, described below, employs either the clutch interface temperature of the clutch assembly 32 or the road grade level to set an engine speed target. Note that the road grade may be calculated as a function of a longitudinal accelerometer reading from a stability control module at zero vehicle speed prior to launch of the vehicle. Alternatively, the current road grade can be determined by GPS.

For higher clutch interface temperatures or higher road grades, the engine speed target 202 as indicated by the input speed 203 t≥t$_2$. Whereas, at low clutch interface temperatures or at low road grades, the engine target speed 204 is still similar to the torque converter launch speed as indicated the input speed t≥t$_3$.

For the case for higher clutch interface temperatures or higher road grades, the engine speed target at which lock-up (that is, microslip) is achieved 208 is reduced. This occurs at t≥t$_4$ where the input speed 203 matches the countershaft speed 201. And for low clutch interface temperatures or for low road grades, the engine target speed for lock-up 206 is similar to the torque converter launch speed. The lock-up for the low temperature or low road grade occurs at t≥t$_4$ where the input speed matches the countershaft speed 201. Note that the shaded areas 210 indicate the amount of energy imparted to the clutch launch. Specifically, lowering the engine speed targets at higher temperatures or higher road grades reduces the launch energy but affects the launch characteristics.

With further reference to FIG. 3, there is shown a process 300 implementing the lock-up profiles described above. In particular, the process 300 sets engine speed targets for friction launch as a function of the accelerator pedal position and the clutch interface temperature or the calculated road grade.

The process 300 begins in step 302 and proceeds to step 304 where the process decides if the lock-up profile is based on the current road grade or the clutch interface temperature. If the process 300 decides to proceed with establishing a lock-up profile based on the current road grade, the process proceeds to step 306. In step 306, the process 300 determines the road grade either through GPS or by use of the longitudinal accelerometer at zero vehicle speed described above. This information is then fed into the controller 190 associated with the dual clutch transmission 10. Note that typically the brake is off at this point, with the driver prepared to step onto the accelerator pedal. Further creep torque may or may not be present from the dual clutch assembly 32. Based on the current road grade, step 306 chooses an appropriate look-up table relating the position of the accelerator pedal with the engine speed target (between 202 and 204) and with the engine speed target at lock-up (between 206 and 208). In step 308, the driver steps on the accelerator pedal, with the engine speed target (between 202 and 204) based on the accelerator pedal position and the current road grade. As the engine speed approaches the engine speed target (between 202 and 204), the clutch assembly 32 engages to accelerate the countershafts 26 or 28, such that the engine speed follows a path to the engine speed target at lock-up (between 206 and 208) based on the current road grad and accelerator pedal position.

The process 300 proceeds to step 310. In this step, as the engine speed nears the engine speed target at lock-up (between 206 and 208), a slip controller is allowed to take over and achieve and maintain microslip until the next shift line is established (step 312).

If the process 300 decides to proceed with establishing a lock-up profile based on the clutch interface temperature of the clutch assembly 32, the process proceeds to step 314. In step 314, the process 300 determines the clutch interface temperature of the dual clutch assembly 32. This information is then fed into the controller 190 associated with the dual clutch transmission 10. Note that typically the brake is off at this point, with the driver prepared to step onto the accelerator pedal. Further creep torque may or may not be present from the dual clutch assembly 32. Based on the clutch interface temperature, step 314 chooses an appropriate look-up table relating the position of the accelerator pedal with the engine speed target (between 202 and 204) and with the engine speed target at lock-up (between 206 and 208). In step 316, the driver steps on the accelerator pedal, with the engine speed target (between 202 and 204) based on the accelerator pedal position and the clutch interface temperature. As the engine speed approaches the engine speed target (between 202 and 204), the clutch assembly 32 engages to accelerate the countershafts 26 or 28, such that the engine speed follows a path to the engine speed target at lock-up (between 206 and 208) based on the clutch interface temperature and accelerator pedal position.

The process 300 proceeds to step 318. In this step, as the engine speed nears the engine speed target at lock-up (between 206 and 208), a slip controller is allowed to take over and achieve and maintain microslip until the next shift line is established (step 312).

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission for a motor vehicle with an engine comprising:
    a transmission housing;
    a dual clutch assembly having a clutch housing connectable to an engine output member, the clutch housing being rotationally supported within the transmission housing, wherein the selective engagement of the dual clutch assembly interconnects the dual clutch housing with at least one of a first input member and a second input member;
    a plurality of gear sets associated with various forward and reverse gear ratios;
    a plurality of synchronizer assemblies that couple at least one of the gear sets with at least one of a first countershaft and a second countershaft, wherein the selective engagement of at least one of the synchronizer assemblies establishes at least one of the forward speed ratios; and
    a controller implemented with an algorithm that provides a lock-up profile for the dual clutch assembly, lock-up occurring when a microslip condition is achieved,
    wherein for a higher clutch interface temperature or a first road grade, an engine speed target at which lock-up is achieved is set at a first speed after which the engine speed target approaches an input speed of the first countershaft or the second countershaft, and for a lower clutch interface temperature or for a second road grade that is lower than the first road grade, the engine speed target at which lock-up is achieved is set to a second speed after which the engine speed target approaches a speed that is less than the input speed of the first countershaft or the second countershaft, the second speed being greater than the first speed.

2. The transmission of claim 1 wherein based on the clutch interface temperature, an accelerator pedal position is related to an target engine speed and an target engine speed at lock-up.

3. The transmission of claim 1 wherein the lock-up profile is based on an accelerator pedal position and a current road grade.

4. The transmission of claim 3 wherein based on the current road grade, the accelerator pedal position is related to an target engine speed and an target engine speed at lock-up.

5. The transmission of claim 3 wherein the current road grade is determined through GPS.

6. The transmission of claim 3 wherein the current road grade is calculated with a longitudinal accelerometer when the motor vehicle is at zero speed.

7. A method of operating a dual clutch transmission associated with a motor vehicle engine comprising:
- determining an accelerator pedal position of the motor vehicle; and
- generating a lock-up profile for the dual clutch transmission based on the accelerator pedal position and on either a clutch interface temperature of the dual clutch transmission or a current road grade, lock-up occurring when a microslip condition is achieved,
- wherein for a higher clutch interface temperature or a first road grade, an engine speed target at which lock-up is achieved is set at a first speed after which the engine speed target approaches an input speed of the first countershaft or the second countershaft, and for a lower clutch interface temperature or for a second road grade that is lower than the first road grade, the engine speed target at which lock-up is achieved is set to a second speed after which the engine speed target approaches a speed that is less than the input speed of the first countershaft or the second countershaft, the second speed being greater than the first speed controlling the dual clutch transmission according to the generated lock-up profile.

8. The method of claim 7 wherein the accelerator pedal position is related to an engine speed target and an engine speed target at lock-up.

9. The method of claim 7 wherein the current road grade is determined through GPS.

10. The method of claim 7 wherein the current road grade is calculated with a longitudinal accelerometer when the motor vehicle is at zero speed.

\* \* \* \* \*